US012585482B2

(12) United States Patent
Zhong et al.

(10) Patent No.: US 12,585,482 B2
(45) Date of Patent: Mar. 24, 2026

(54) MANAGEMENT THROUGH ON-PREMISES AND OFF-PREMISES SYSTEMS

(71) Applicant: Dell Products L.P., Round Rock, TX (US)

(72) Inventors: Haijun Zhong, Shanghai (CN); Muzhar S. Khokhar, Shrewsbury, MA (US); Michael Varteresian, Lexington, MA (US); Wenfeng Li, Shanghai (CN); Harvey Chao Wang, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 521 days.

(21) Appl. No.: 17/584,735

(22) Filed: Jan. 26, 2022

(65) Prior Publication Data

US 2023/0236862 A1    Jul. 27, 2023

(51) Int. Cl.
G06F 9/455        (2018.01)

(52) U.S. Cl.
CPC .................... G06F 9/45558 (2013.01); *G06F 2009/45595* (2013.01)

(58) Field of Classification Search
CPC .................. G06F 9/45558; G06F 2009/45595
USPC ............................................................. 718/1
See application file for complete search history.

(56) References Cited

U.S. PATENT DOCUMENTS

| | | | |
|---|---|---|---|
| 2007/0168498 A1* | 7/2007 | Lambert | H04L 41/344 709/224 |
| 2009/0031013 A1* | 1/2009 | Kunchipudi | G06F 9/4416 709/222 |

| | | | |
|---|---|---|---|
| 2012/0110448 A1* | 5/2012 | Jhoney | G06F 9/45512 715/704 |
| 2013/0166081 A1* | 6/2013 | Sanders | G05B 11/01 700/286 |
| 2014/0351881 A1 | 11/2014 | Das et al. | |
| 2016/0134488 A1 | 5/2016 | Straub et al. | |
| 2016/0197775 A1 | 7/2016 | Chawla et al. | |
| 2017/0006576 A1* | 1/2017 | Barrett | H04W 64/003 |
| 2017/0013456 A1 | 1/2017 | Zhang et al. | |
| 2018/0184231 A1* | 6/2018 | Egner | H04W 24/10 |
| 2018/0232256 A1* | 8/2018 | Chaganti | G06F 9/5061 |
| 2020/0014669 A1 | 1/2020 | Lawson et al. | |
| 2020/0195607 A1* | 6/2020 | Wang | H04L 63/0236 |
| 2021/0006623 A1 | 1/2021 | Joao | |
| 2021/0409367 A1 | 12/2021 | Viswambharan et al. | |
| 2022/0329604 A1 | 10/2022 | Guy et al. | |

OTHER PUBLICATIONS

Final Office Action, U.S. Appl. No. 17/568,508, mailed Mar. 26, 2024, U.S. Patent and Trademark Office.
Non-Final Office Action, U.S. Appl. No. 17/568,508, mailed Sep. 15, 2023, U.S. Patent and Trademark Office.

* cited by examiner

*Primary Examiner* — Pierre Vital
*Assistant Examiner* — Jordan Scott Motter
(74) *Attorney, Agent, or Firm* — Jackson Walker L.L.P.

(57) ABSTRACT

An information handling system may include at least one processor and a memory. The information handling system may be configured to: receive a management request from an administrator device regarding management of a remote information handling system located at a particular datacenter; and provide the administrator device access to a selected set of management operations, wherein the set is selected based on a determination of whether or not the administrator device is on-premises at the particular datacenter.

9 Claims, 3 Drawing Sheets

MANAGEMENT THROUGH ON-PREMISES AND OFF-PREMISES SYSTEMS

TECHNICAL FIELD

The present disclosure relates in general to information handling systems, and more particularly to providing access to cloud-based management tools from administrator devices that are on-premises or off-premises. This application is related to U.S. patent application Ser. No. 17/568,508, filed Jan. 4, 2022 and entitled "DETECTION OF ON-PREMISES SYSTEMS" (the '508 application) which is incorporated by reference herein in its entirety.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware® vSphere® ESXi™ environment, or any other HCI management system). Some examples of HCI systems may operate as software-defined storage (SDS) cluster systems (e.g., an SDS cluster system such as the VMware® vSAN™ system, or any other SDS cluster system).

In the HCI context (as well as other contexts), customers sometimes use cloud-based management tools to manage their information handling systems. For example, for a Dell EMC VxRail™ HCI system, a cloud-based management tool known as Analytical Consulting Engine (ACE) or MyVxRail is one such solution. In one embodiment, a customer administrator may access a management web page hosted by an HCI manufacturer, and cloud-based tools may then provide management functionality of the customer's assets. A cloud-based management tool may also be referred to herein as a cloud management portal.

For example, an administrator may initiate some operation from a web browser coupled to a website of a cloud system, and the cloud system may then distribute commands associated with the operation to the affected edge devices. The web browser may be running on a computer (e.g., a laptop) that has access to the data center's local network (on-premises) or does not have access to the local network (off-premises).

With cloud-based management tools, some operations (e.g., system upgrades, making configuration changes, other sensitive tasks, etc.) may need the customer to input account credentials (e.g., administrator- or root-level credentials) to complete the task. For security reasons, these operations typically cannot be initiated via the cloud portal to the customer's on-premises systems when the administrator's device is connected through a public network such as the internet. For such sensitive operations, the customer thus may need to be on-premises (e.g., physically at the datacenter in question, or connected via a VPN or the like) to run the operations. Other operations (e.g., making minor configuration changes, monitoring operations without making changes, etc.) may be available even when the customer is off-premises.

Accordingly, it may be advantageous for the cloud portal system to provide access to different operations depending on whether the customer is on-premises or off-premises. Embodiments of this disclosure may detect whether a system (e.g., a system through which an administrator is accessing a cloud management portal) is on-premises or not. A first set of operations may be possible for on-premises administrator systems, and a second set (e.g., a restricted set) may be possible for off-premises administrator systems.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with on-premises and off-premises management may be reduced or eliminated.

In accordance with embodiments of the present disclosure, an information handling system may include at least one processor and a memory. The information handling system may be configured to: receive a management request from an administrator device regarding management of a remote information handling system located at a particular datacenter; and provide the administrator device access to a selected set of management operations, wherein the set is selected based on a determination of whether or not the administrator device is on-premises at the particular datacenter.

In accordance with these and other embodiments of the present disclosure, a method may include receiving, by an information handling system, a management request from an administrator device regarding management of a remote information handling system located at a particular datacenter; and providing, by the information handling system, the administrator device access to a selected set of management operations, wherein the set is selected based on a determination of whether or not the administrator device is on-premises at the particular datacenter.

In accordance with these and other embodiments of the present disclosure, an article of manufacture may include a non-transitory, computer-readable medium having computer-executable instructions thereon that are executable by a processor of an information handling system for: receiving a management request from an administrator device regarding management of a remote information handling system located at a particular datacenter; and providing the administrator device access to a selected set of management operations, wherein the set is selected based on a determination of whether or not the administrator device is on-premises at the particular datacenter.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
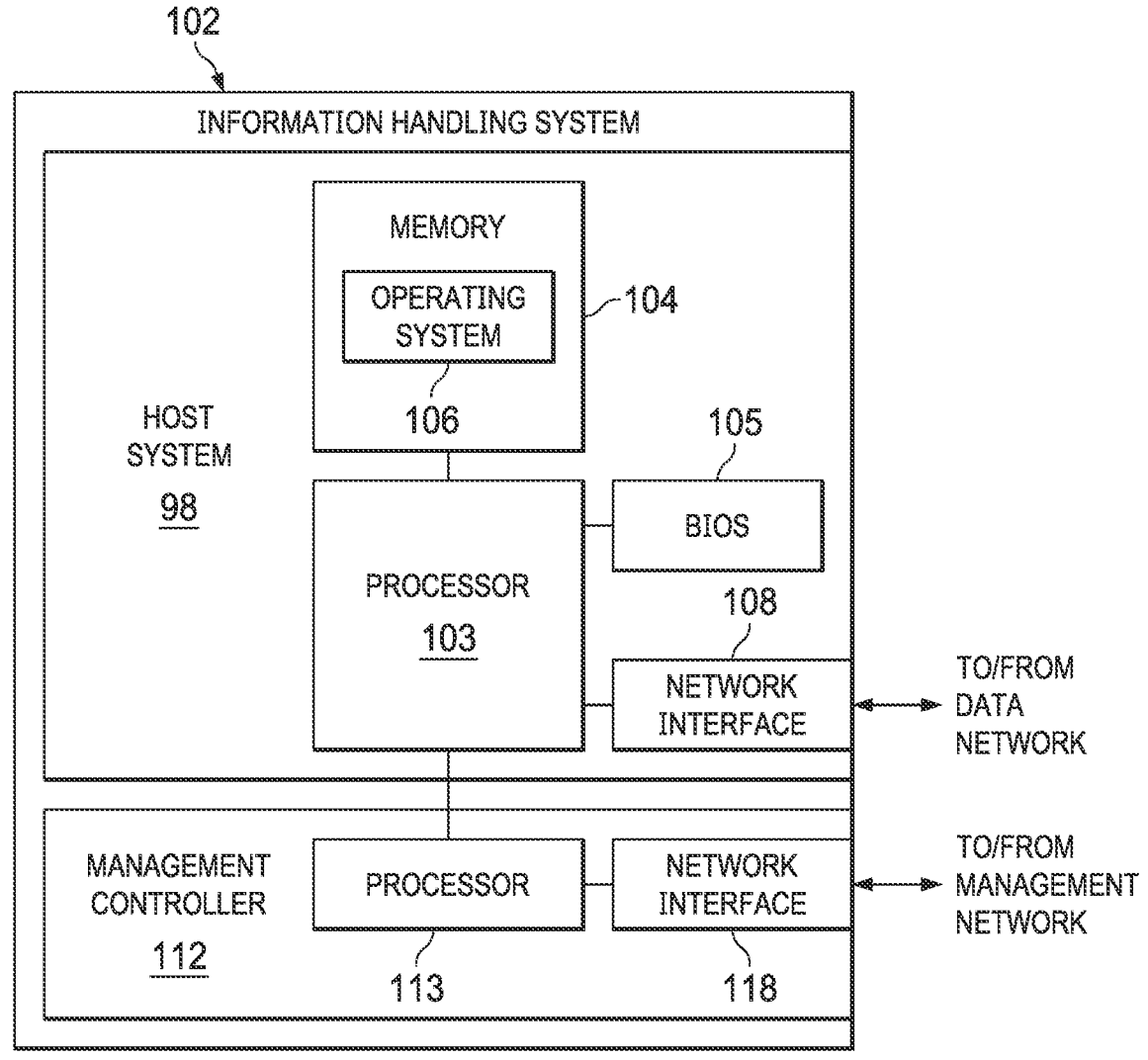
FIG. 1 illustrates a block diagram of an example information handling system, in accordance with embodiments of the present disclosure.
Figure 2:
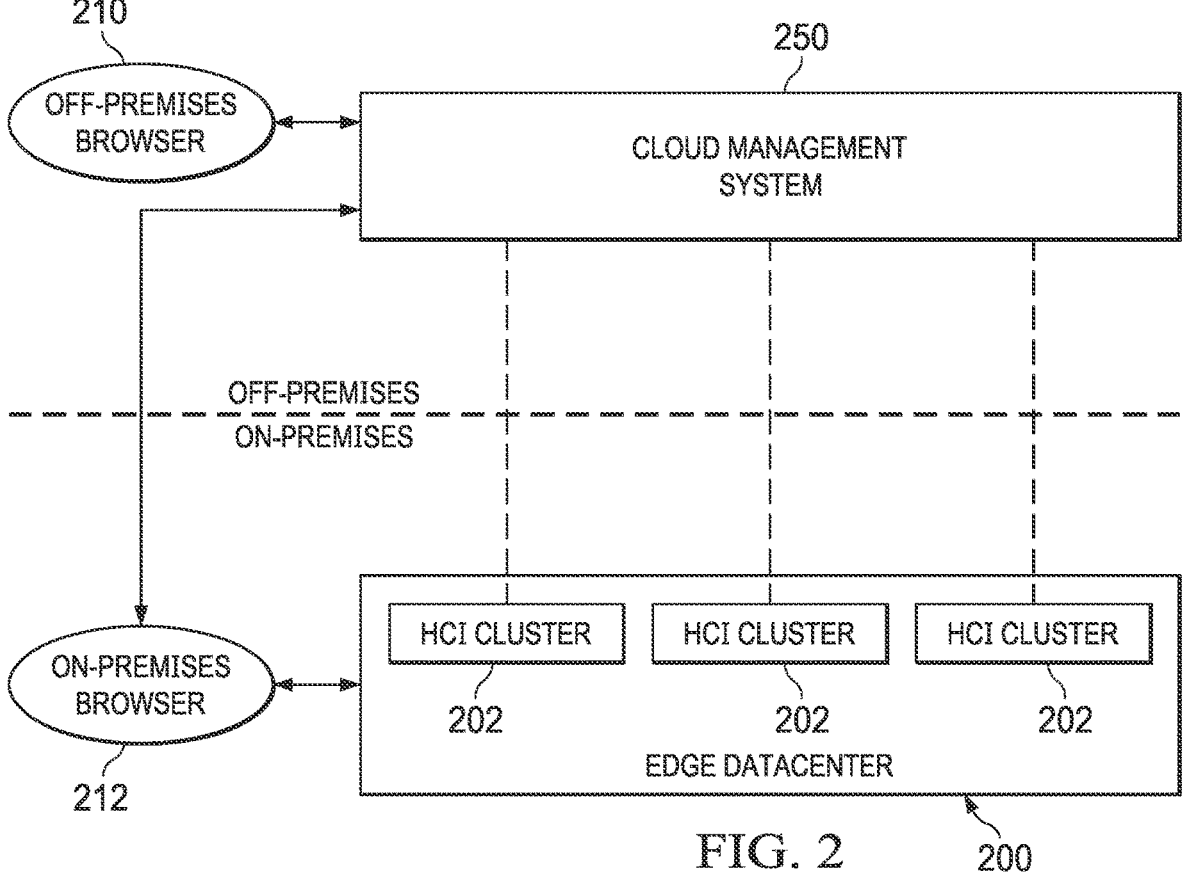
FIG. 2 illustrates a block diagram of an example architecture, in accordance with embodiments of the present disclosure.
Figure 3:
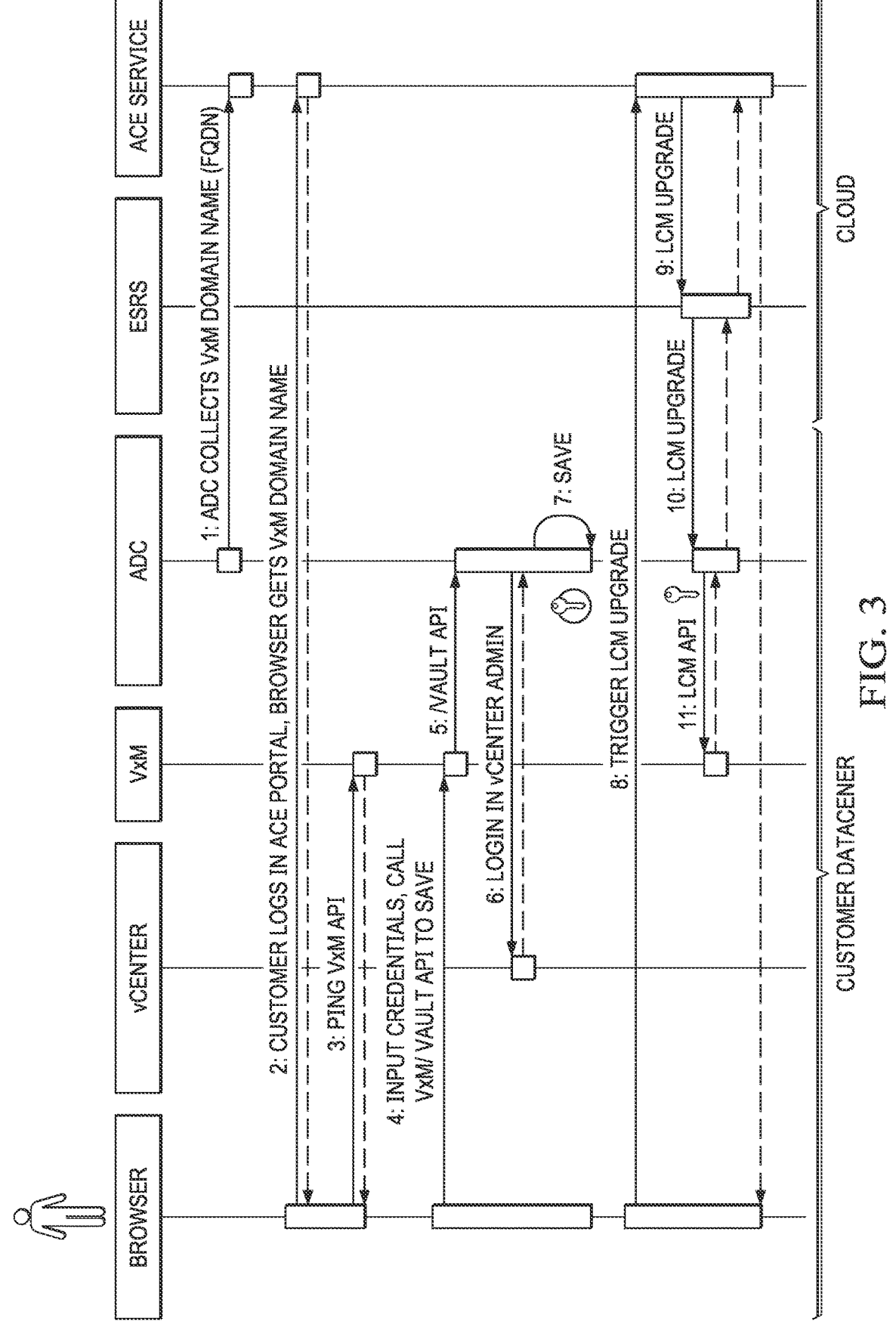
FIG. 3 illustrates an example sequence diagram, in accordance with embodiments of the present disclosure.

Preferred embodiments and their advantages are best understood by reference to FIGS. 1 through 3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, embodiments of this disclosure may enable detection of whether a device (e.g., a device through which an administrator is accessing a cloud management portal) is on-premises at a customer datacenter and connecting via the local secure network vs. being off-premises and connecting via some other network such as the internet. The administrator's system that is used to connect to the cloud management portal may be referred to herein as the administrator's device. When the administrator's device is on-premises, one set of management operations may be available, while a second set (e.g., a restricted set) may be available for an administrator's device that is off-premises.

FIG. 2 illustrates an example architecture, according to one embodiment. An edge datacenter 200 includes one or more HCI clusters 202, which are managed by cloud management system 250. For example, cloud management system 250 may be communicatively coupled to HCI clusters 202 via a secure communication channel such as Dell® Secure Remote Services™ (SRS or ESRS) in one embodiment.

Instructions for management tasks may be received at cloud management system 250 from either an off-premises browser 210 or an on-premises browser 212. The '508 application discloses certain methods for distinguishing between these two cases. One of ordinary skill in the art with the benefit of this disclosure will appreciate that the methods disclosed by the '508 application or other methods may be used in certain embodiments in order to make such determinations.

Embodiments of this disclosure may provide secure methods for allowing administrators to perform management tasks from both on-premises and off-premises administrator devices. For example, an off-premises administrator's browser may be allowed only to obtain monitoring information and other basic information about the systems under management from cloud management system 250. (In other embodiments, certain low-level active management operations may be permitted.) Active management operations (or in some embodiments, particularly sensitive or high-level operations) may be available only from the on-premises network.

Sensitive data such as login credentials may be saved only on the administrator's own system, and not in the cloud. Active management commands may be run on-premises, and data regarding their progress may be sent back to the cloud management system 250 through a secure channel as mentioned above. Such data may be made available to administrator systems that are on-premises or off-premises in some embodiments.

Turning now to FIG. 3, a sequence diagram flow chart is shown of an example method 300 for performing a lifecycle management (LCM) upgrade of an HCI cluster, by an administrator using an on-premises device. As used herein, the term LCM refers to an approach for upgrading components (e.g., software and/or firmware components) within a cluster of information handling systems.

In this embodiment, components such as the administrator's web browser, and various HCI management components may be located on-premises at the customer's edge datacenter. The HCI management components may include VMWare vCenter, VxRail Manager (VXM), and Adaptive Data Collector (ADC). Other components such as Secure Remote Services (ESRS) and Analytical Consulting Engine (ACE) Service may run off-premises in a cloud management platform.

At step 1, the ACE Service may receive information (e.g., domain names such as fully qualified domain names (FQDNs)) regarding one or more VxM instances running at the customer datacenter.

At step 2, the administrator may log into a portal website for ACE, and the administrator's web browser may retrieve the domain name information from step 1.

At step 3, the administrator's web browser may access the VxM Application Programming Interface (API), which may be accessible when the administrator's web browser is on-premises. However, if the administrator's web browser is off-premises, that may be detected at step 3.

Step 3 illustrates a single "ping" to the VxM API. However, as described in the '508 application, in some embodiments, multiple such interactions may be present, and they need not be implemented via an actual ping procedure.

For example, in one embodiment, a plurality of VxM endpoints may be pinged in order to make the on/off-premises determination more reliable. The pinging process may also continue in the background so that if an on-premises user becomes off-premises (e.g., by losing VPN connectivity), the method may will switch from an on-premises embodiment to an off-premises embodiment in real time.

At steps 4-7, the administrator may input access credentials and save them via a VxM API. The credentials may be saved in a secure storage solution such as a lockbox using a cryptosystem such as Rivest-Shamir-Adleman (an "RSA lockbox"), etc. within the on-premises datacenter.

At step 8, the administrator may trigger an LCM upgrade event by accessing the ACE service. The ACE Service may then cause the upgrade to take place at steps 9-11 by using the credentials stored in the VxM vault. In this embodiment, the access credentials do not need to be transmitted to the cloud management system.

One of ordinary skill in the art with the benefit of this disclosure will understand that the preferred initialization point for the method depicted in FIG. 3 and the order of the steps comprising that method may depend on the implementation chosen. In these and other embodiments, this method may be implemented as hardware, firmware, software, applications, functions, libraries, or other instructions. Further, although FIG. 3 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
at least one processor; and
a memory;
wherein the information handling system is configured to:
receive a management request from an administrator device regarding management of a remote information handling system located at a particular datacenter, wherein the management request is received at a cloud portal from a web browser executing on the administrator device;
determine whether the administrator device is on-premises at the particular datacenter by causing the administrator device to attempt to access a plurality of network addresses associated with a datacenter network of the particular datacenter, wherein the plurality of network addresses are accessible by the administrator device only if the administrator device is physically located at the particular datacenter or is connected to the datacenter network via a virtual private network (VPN), and wherein in response to any of the attempted accesses succeeding, the administrator device is determined to be on-premises;
provide the administrator device access to a selected set of management operations, wherein the set is selected based on the determination of whether or not the administrator device is on-premises at the particular datacenter, wherein, in response to the administrator device being on-premises at the particular datacenter, the selected set includes management operations for modifying a configuration of the remote information handling system, and wherein, in response to the administrator device not being on-premises at the particular datacenter, the selected set includes management operations for monitoring the remote information handling system, but does not include management operations for modifying a configuration of the remote information handling system;
receive a request from the administrator device to carry out a particular management operation from the selected set of management operations; and
execute the particular management operation.

2. The information handling system of claim 1, wherein the remote information handling system comprises a cluster of information handling systems.

3. The information handling system of claim 2, wherein the cluster is a hyper-converged infrastructure (HCI) cluster.

4. A computer-implemented method comprising:

receiving, by an information handling system, a management request from an administrator device regarding management of a remote information handling system located at a particular datacenter, wherein the management request is received at a cloud portal from a web browser executing on the administrator device;

determining, by the information handling system, whether the administrator device is on-premises at the particular datacenter by causing the administrator device to attempt to access a plurality of network addresses associated with a datacenter network of the particular datacenter, wherein the plurality of network addresses are accessible by the administrator device only if the administrator device is physically located at the particular datacenter or is connected to the datacenter network via a virtual private network (VPN), and wherein in response to any of the attempted accesses succeeding, the administrator device is determined to be on-premises;

providing, by the information handling system, the administrator device access to a selected set of management operations, wherein the set is selected based on the determination of whether or not the administrator device is on-premises at the particular datacenter, wherein, in response to the administrator device being on-premises at the particular datacenter, the selected set includes management operations for modifying a configuration of the remote information handling system, and wherein, in response to the administrator device not being on-premises at the particular datacenter, the selected set includes management operations for monitoring the remote information handling system, but does not include management operations for modifying a configuration of the remote information handling system;

receiving a request from the administrator device to carry out a particular management operation from the selected set of management operations; and executing the particular management operation.

5. The method of claim 4, wherein the remote information handling system comprises a cluster of information handling systems.

6. The method of claim 5, wherein the cluster is a hyper-converged infrastructure (HCI) cluster.

7. An article of manufacture comprising a non-transitory, computer-readable medium having computer-executable instructions thereon that are executable by a processor of an information handling system for:

receiving a management request from an administrator device regarding management of a remote information handling system located at a particular datacenter, wherein the management request is received at a cloud portal from a web browser executing on the administrator device;

determining whether the administrator device is on-premises at the particular datacenter by causing the administrator device to attempt to access a plurality of network addresses associated with a datacenter network of the particular datacenter, wherein the plurality of network addresses are accessible by the administrator device only if the administrator device is physically located at the particular datacenter or is connected to the datacenter network via a virtual private network (VPN), and wherein in response to any of the attempted accesses succeeding, the administrator device is determined to be on-premises;

providing the administrator device access to a selected set of management operations, wherein the set is selected based on the determination of whether or not the administrator device is on-premises at the particular datacenter, wherein, in response to the administrator device being on-premises at the particular datacenter, the selected set includes management operations for modifying a configuration of the remote information handling system, and wherein, in response to the administrator device not being on-premises at the particular datacenter, the selected set includes management operations for monitoring the remote information handling system, but does not include management operations for modifying a configuration of the remote information handling system;

receiving a request from the administrator device to carry out a particular management operation from the selected set of management operations; and executing the particular management operation.

8. The article of claim 7, wherein the remote information handling system comprises a cluster of information handling systems.

9. The article of claim 8, wherein the cluster is a hyper-converged infrastructure (HCI) cluster.

* * * * *